Oct. 5, 1943.  W. F. GAYRING  2,331,023
SAFETY CONTROL FOR POWER OPERATED MACHINES
Filed April 9, 1942  3 Sheets-Sheet 1
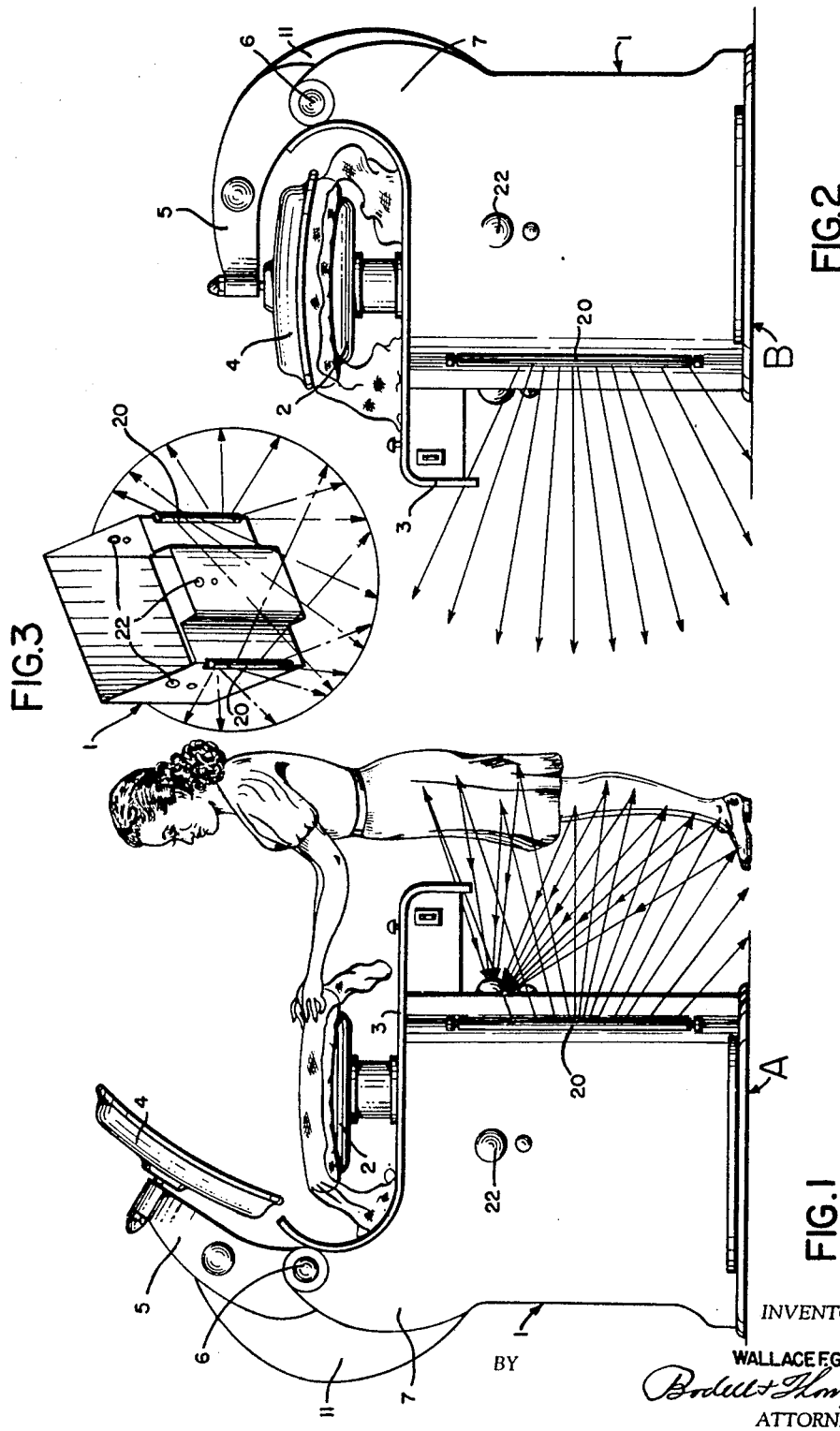
INVENTOR.
WALLACE F. GAYRING
BY
ATTORNEYS

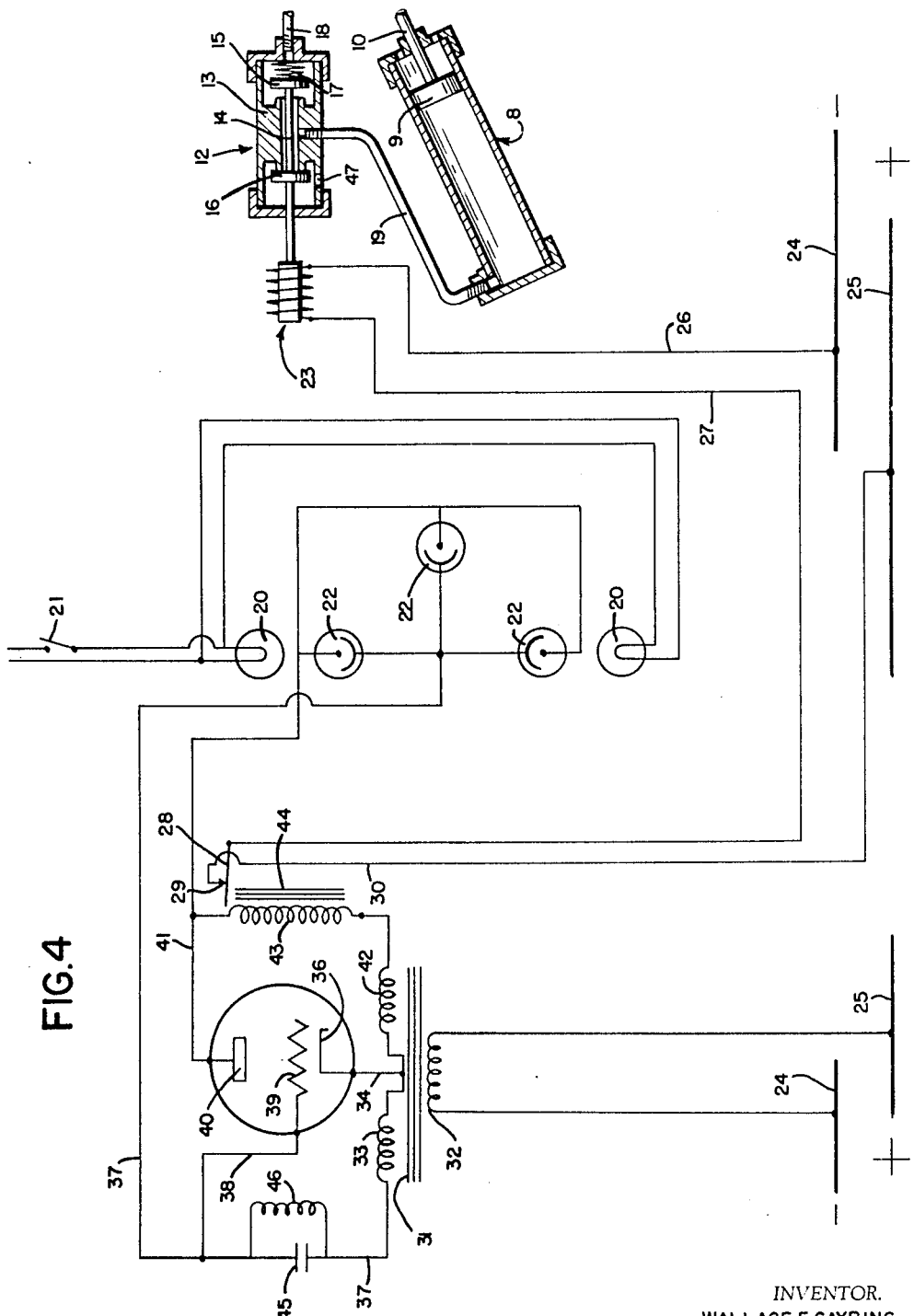

Oct. 5, 1943.   W. F. GAYRING   2,331,023
SAFETY CONTROL FOR POWER OPERATED MACHINES
Filed April 9, 1942   3 Sheets-Sheet 3

INVENTOR
WALLACE F. GAYRING
BY
ATTORNEYS

Patented Oct. 5, 1943

2,331,023

UNITED STATES PATENT OFFICE 2,331,023

SAFETY CONTROL FOR POWER OPERATED MACHINES

Wallace F. Gayring, Minoa, N. Y., assignor to The Prosperity Company, Inc., Syracuse, N. Y., a corporation of New York Application April 9, 1942, Serial No. 438,308

7 Claims. (Cl. 250—41.5)

This invention relates to safety controls for power operated machines having an opening and closing movement, as garment and laundry pressing machines, and has for its object a control for such machines operated by light from a source reflected from the operator when within the operating or danger zone of the machine, for opening the machine or holding it open and to effect the closing of the machine, when the operator moves out of the operating zone, so that no light is reflected on the photoelectric cell from a source of light. The operator may wear a white apron or any other object facilitating the reflection of the light.

The invention further has for its object a machine embodying such a control in which the operating means also embodies a timer for opening the machine after a predetermined time, even though the operator is away from the machine, or out of the operating zone thereof, the operating of the timer cutting out the press closing circuits, and additional photoelectric cell controlled circuits operating to again cut in the normal control circuits when the operator again comes into the operating zone of the machine, after it has been opened by the timer, so that when the operator now steps out of the zone, the press will close.

The invention consists in the novel features and the combinations and constructions hereinafter set forth and claimed.

In describing this invention, reference is had to the accompanying drawings in which like characters designate corresponding parts in all the views.

Figure 1 is a side elevation of a pressing machine embodying this invention, the same being shown as in open position, because the operator is within the range of the source of light, so that light is reflected from the operator onto the photoelectric cell or cells.

Figure 2 is a side elevation of a similar machine when the press is closed showing its location to the first machine.

Figure 3 is a diagrammatic view of the machine frame and the angles at which the light will be reflected from the operator onto the photoelectric cell when the operator is within the operating zone.

Figure 4 is a diagrammatic view of the operating circuit and the amplifying circuit for controlling it and a source of light, and photoelectric cell arrangement for energizing the electronic circuit, the motor of the machine being also shown.

Figure 5:
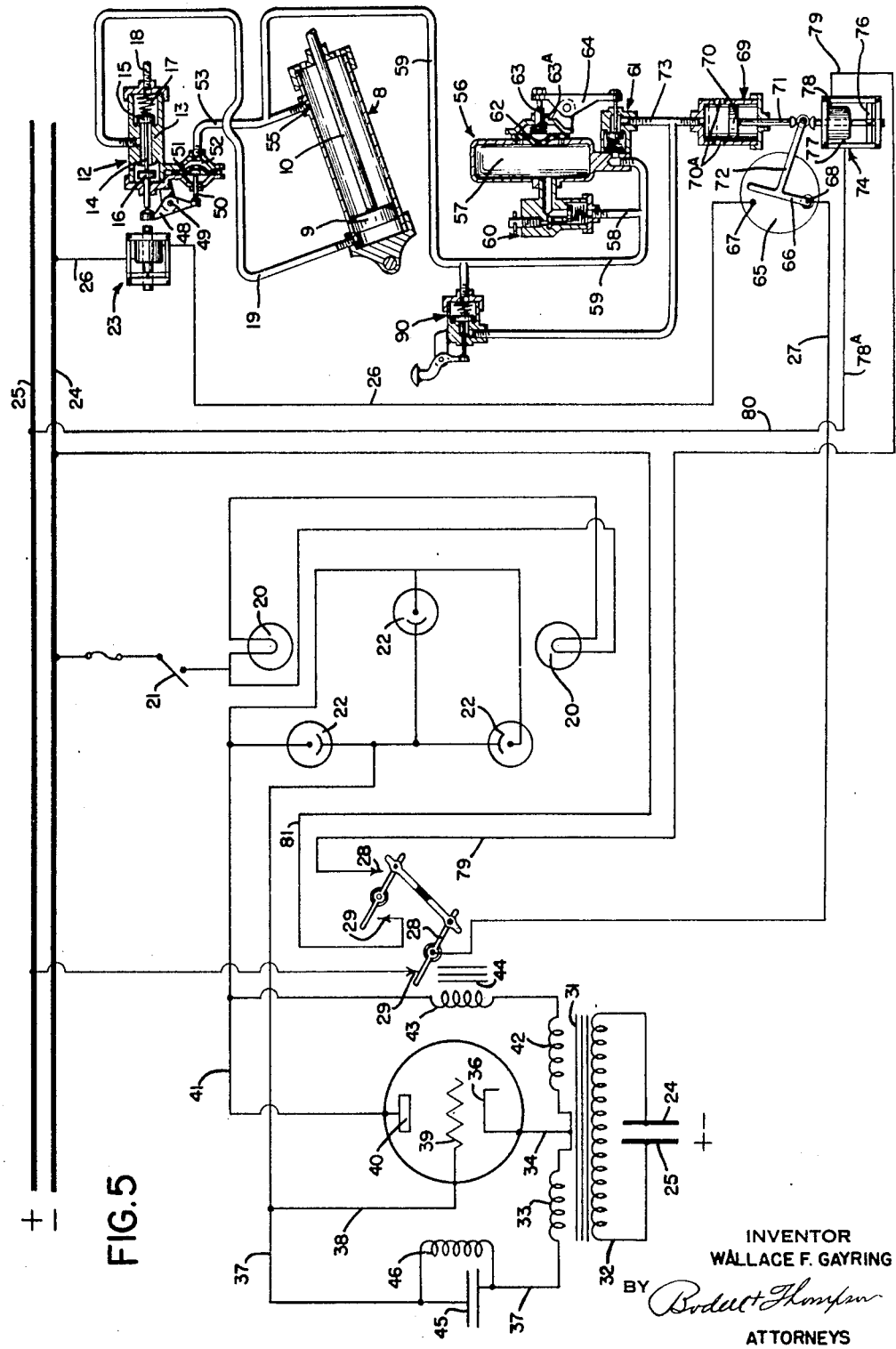
Figure 5 is a diagrammatic view of the operating circuits for the control of the machine, when a timer is used to open the press.

This safety control includes a control element operable to control the flow of power to the motor of the actuating mechanism of the machine, as a pressing machine, means for operating the control including a source of light, a photoelectric cell arranged out of the path of the rays from the source of light and in the path of the rays reflected from a person, as the operator, coming within the range of the operating zone, electronic amplifying circuits controlled by the photoelectric cell and controlling a feed circuit for an electro-responsive device or relay which operates the power control element.

The invention is shown as embodied in a platen laundry press including a stationary lower pressing element or buck, and a power actuated press head movable toward and from the buck.

As illustrated in Figure 4, the motor of the actuating means is a cylinder and piston motor and the power is compressed air. Hence, the control element is a valve.

The operator usually works on a plurality of, here shown as two, machines. When making a lay on one machine, the other machine is closed. When the operator moves away from one machine out of the range of the source of light thereon, the open machine closes automatically, and when the operator comes within the range of the other machine and the light reflects from the operator on to the photoelectric cell, that machine opens.

The machines here shown as paired to be tended by one operator, are designated A and B. Each machine includes a suitable frame 1, a lower pressing element or buck 2 mounted above a table top 3 on the frame 1, and an upper pressing element or head 4 having an operating movement toward and from the buck 2. The head 4 is shown as carried by a lever 5 pivoted at 6 to an upright bracket 7 rising from the frame in the rear of the buck. The lever 5 is actuated by any suitable mechanism including a motor, and motion transmitting means between the motor and the lever 5. The motor is here shown as pressure operated and includes a cylinder 8 and a single acting piston 9 therein, the motion of which is transferred through the piston rod 10 and suitable mechanism including an element 11. The press opens under the action of countersprings. As the motion transmitting mechanism forms no part of this invention and as various forms of motion transmitting mechanisms are well known, further description is thought to be unnecessary for an understanding of this invention.

12 designates the element for controlling the flow of power to the motor, and as the power is a pressure fluid, as compressed air, this control element is a valve of the combined intake and exhaust type. The valve includes a casing 13 having a double valve member 14 therein, which carries a normally open intake valve head 15 and a normally closed exhaust valve head 16, these being connected together so that they act as a unit. The valve member 14 is pressed by a spring 17 in a direction to close the intake head 15 and open the exhaust head 16, but, as will be hereinafter explained, the valve member is normally held with the exhaust valve head open, as seen in Figure 4. The intake end of the casing 13 is connected by a pipe 18 to a suitable source of compresesd air, and the valve casing is connected by a pipe 19 to the intake end of the cylinder 8.

20 designates the source of light, as a lamp bulb, connected in a suitable feed circuit controlled by a switch 21. The switch is closed in the normal operation of the machine. 22 designates a photoelectric cell to be energized by the light rays from the source of light 20, but not by the rays directly therefrom, but from rays reflected from the operator, as seen in Figure 1, when the operator comes within the range of the operating zone of the machine. The rays may be reflected from a white apron or the dress of the operator, or from a special reflecting object carried by the operator. There are usually three photoelectric cells located to receive the reflected rays when the operator is in front of the machine or on either lateral side thereof. The photoelectric cells are connected in circuits for energizing the amplifying circuit which, when amplified, operates a relay switch in a circuit in which the coils of a relay or solenoid are connected, the relay operating the valve member 14 to open it and hold it open, except when the operator comes within the operating zone of the machine.

23 designates the electro-responsive device or relay for operating the valve member 14 of the control valve 12. The coils of the relay are connected to service wires 24 and 25 by wire 26 and a wire 27 connected to the movable arm 28 of the relay switch, said arm 28 being normally engaged with the contact 29 connected by a wire 30 to the other feed wire 25. Thus, normally the circuit through the relay 23 is closed and the control valve is operated with its intake valve head 15 open and its exhaust valve head 16 closed, so that air is free to pass through the cylinder and close the press and hold it closed. The relay switch arm 28 is the armature of a relay operated by the amplification of the current in the electronic circuit. The electronic circuit may be of any well known arrangement. That here shown includes a transformer 31, the primary coil 32 of which is connected across the feed wires 24, 25 and the secondary coil 33 of which is connected by a tap or line 34 to the cathode 35 of a thermionic tube 36 and also by a tap 37 and wire 38 to the control grid 39 of the tube, the wire 37 being also connected to like terminals of the photoelectric cells. The anode 40 of the tube is connected by a wire 41 to the other terminals of the photoelectric cells. The secondary coil 33 is also connected by a tap 42 to one end of the primary coil 43 of a relay, the other end of which is connected to the wire 41 leading from the anode 40. The relay switch arm 28 is the armature for the core 44 of the relay 43 and said switch arm 28 is normally spaced from the armature 44. A suitable condenser 45 and resistance 46 around the condenser is located in the wire 37.

In operation of the form shown in Figure 4, the relay switch arm 28 being in engagement with the contact 29, the relay 23 is energized, and hence the valve 14 in position shown in Figure 4, in which the intake valve head 15 is open and the exhaust valve head 16 closed, and hence the press closed. Then the rays from the sources of light 20 do not strike any of the photoelectric cells 22. When, however, the operator comes within the operating range of the machine, the light reflects from her garments onto one or more of the photoelectric cells depending upon the angle at which she approaches the machine, whereupon the current through the coils of the relay 43 are amplified sufficiently to cause the core 44 to operate the relay switch arm 28 to break engagement with the contact 29, thus opening the circuit to the relay 23, permitting the spring 17 to close the intake valve head 15 and open the exhaust valve head 16. Thus, air can exhaust from the cylinder back through the pipe 19 past the open exhaust valve head 16 to the outer air through ports 47. It will be understood that the press is opened by countersprings which are loaded during the closing movement of the press. As long as the operator is within the operating zone in front or at the sides of the machine (Figure 3), at least one of the photoelectric cells will be energized by light rays reflected from the operator, and hence the press will remain open. When the operator steps away from the machine, or is in the position shown in Figure 2, relatively to the machine B, the light rays are no longer reflected on any one of the photoelectric cells. Hence the amplifying circuit and the relay 43 are de-energized, so that the relay switch arm 28 again engages the contact 29 and closes the circuit through the windings of the relay 23.

In Figure 5 is shown diagrammatically electronic control mechanism embodying a timer for opening the press after a predetermined period without requiring the presence of the operator in so doing, the timer breaking the energizing circuit to the relay 23 which operates the control valve, by opening a cut-out switch in the energizing circuit for the relay 23 in series with the switch arm 28, and also an arrangement for resetting the cut-out switch when the operator again comes within the operating zone of the machine and the light reflects onto any one of the photoelectric cells.

In Figure 5, the electro-responsive device or relay 23, or the movable member thereof, instead of thrusting directly against the stem of the valve member 14, as in Figure 4, operates through an intermediate member, as against one arm of a lever 48 pivoted at 49 between its ends, the lever coacting at its other end with the plunger 50 operated by a diaphragm 51 in a diaphragm chamber 52, the pressure side of which is connected by a pipe 53 to a port 55 in the side of the cylinder 8. The port is located to be uncovered by the piston 9 when the piston approaches the end of its power stroke, and hence when the press is closed. When the port is uncovered, air enters the diaphragm chamber, actuates the diaphragm therein and through the plunger 50 and the lever 48 holds the control valve member 14 in the position it has been operated by the relay 23, thus taking the control away from the relay. As the press is closed or nearly closed, when the piston 9 passes the port 55, the valve member 14 is locked in its operated position by the closing of the press, regardless of whether the locking operation is effected by the movement of the piston 9, or some other part of the motion transmitting means between the piston 9 and the press head 4. As it is old, in so far as this invention is concerned, to time the locking of a press closed by a port in the side of the piston, or by motion transmitting means operated by the piston to close the press, or by other time locking means, the particular mechanism for timing the locking of the control valve in operated position is, per se, not part of this invention, and any suitable timed locking mechanism may be used.

The means for cutting out, or opening, the circuit to the relay 23 and for timing the opening of the press and holding it open when the operator is out of the operating zone and hence the light is not being reflected onto the photoelectric cells, is designated by the numeral 56. This timer, as illustrated, includes a chamber 57 connected by pipes 58, 59 to the port 55, it being shown as connected directly to the pipe 53, a pressure regulating valve 60 in the pipe 58, a normally closed, spring pressed, exhaust valve 61 for opening the pipe 59 to the outer air, and a diaphragm 62 exposed to the pressure in the chamber 57 and operating a plunger 63, which plunger through suitable motion transmitting means, as a lever 64, acts on the stem of the spring pressed exhaust valve 61 to open it when a predetermined pressure is reached in the chamber 57. The pressure in the diaphragm chamber 52 having been released, the control valve member 15 is operated to close the intake valve head 15 and open the exhaust valve head 16, so that air may exhaust from the cylinder back through the pipe 19 and the valve casing 13 to the outer air, so that the press is free to open under the action of the countersprings. The valve 61 exhausts to the outer air, as will be presently described.

The pressure regulating valve 60 may be of any suitable construction. It is adjustable to vary the period it requires for the pressure to build up to a predetermined degree in the chamber 57, and hence adjust the time the press remains closed. The timer may also be of any suitable construction.

The means for operating a cut-out switch in the energizing circuit for the relay 23 is also operated by the press locking means, and when the cut-out switch is operated, the press will not again close, after it has been opened by the timer, even though the operator is out of the operating zone and no light reflected onto the photoelectric cell.

Means is also provided for again closing the energizing circuit through the relay 23 or for resetting the cut-out switch when the operator comes into the operating zone. When the operator comes into the operating zone and the light is reflected onto one or more of the photoelectric cells, the cut-out switch is reset, but because the operator is in the operating zone, the relay 23 will not be energized as long as she is in the operating zone.

In the construction shown in Figure 5, the control valve 12, piston 9, and exhaust valve 61 in the pipe 59 leading to the chamber 57 of the timer through the pressure regulating valve 60, are shown in their positions assumed when the press has been opened by the timer and the cutout switch in the energizing circuit for the relay 23, opened.

65 designates the cut-out switch in the energizing circuit wires 26, 27 for the relay 23 and in series with the switch arm 28 in said circuit. 66 is a movable, as a rocking, switch arm pivotally mounted between its ends in the switch 65 and normally bridging contacts 67, 68 of the switch 65. When the press closes and the piston 9 passes the port 55, so that air commences to flow to the chamber 57 of the timer 56, through the pressure regulating valve 60, air also flows from the pipe 59 into the casing of the exhaust valve 61, which is closed. When the predetermined pressure is reached in the chamber 57 of the timer 56, the diaphragm 62 is deflected and the motion thereof transferred through plunger 63 to the movable member of the exhaust valve 61, opening said valve against its spring. The air then passes through the casing of the exhaust valve 61 and a pipe 73 to a pressure operated device as a cylinder 69 having a piston 70 therein, which through its rod 71 operates an arm 72 connected to the switch arm 66. The piston 70 when thus actuated uncovers exhaust ports 70A in the cylinder 69 to permit the air to release from the diaphragm chamber 52 through pipes 53, 59, valve 61 and pipe 73. Thus, when the press is closed, the piston 70 is actuated, and hence the switch arm 66 shifted out of contact with the contacts 67, 68, so that the circuit to the relay 23 is open. The press will therefore remain open, even though the operator is out of the operating zone and no light being reflected onto the photoelectric cells.

The means for resetting the cut-out switch 66 in closed position, or in position to bridge the contacts 67, 68, so as to return the control to the relay 23, when the operator again enters the operating zone of the machine and light is reflecting onto the photoelectric cells, includes a relay 74, similar to the relay 23, and controlled by a switch arm 76 normally spaced from contacts 77, 78 and brought into contact therewith when the core 44 of the relay 43 in the electronic amplifying circuit is energized sufficiently to attract its armature or switch arm 28 to cause said switch arm 28 to separate from the contact 29. The contact 78 is connected to a wire 79, which is connected to one end of the windings of the relay 74, the other end being connected by wire 78ª to the feed wire 25, while the switch arm 77 is connected by wire 80 to the other feed line 24. The switch arms 28 and 76 are mounted to work as a unit, but insulated from each other, and in different energizing circuits connected to the feed lines 24, 25. The switch arms are so mounted that when the switch arm 28 is engaged with its contact 29, the switch arm 76 is out of engagement with its contact 77, 78 and vice-versa. Therefore, when the press is closed and being held closed by the timer, the cut-out switch 65 is closed and also the switch arm 28 in contact with the contact 29 and the switch arm 76 out of contact with the contact 29 and the switch arm 76 out of contact with the contacts 77 and 78. When sufficient pressure is built up in the chamber 57 of the timer 56 to deflect the diaphragm 62 and open the exhaust valve 61 and the press, the air passes from the valve casing 61 through pipe 73 to the cylinder 69 and actuates the piston therein to cause its rod 71 to shift the switch arm 66 out of engagement with contact 77 and open the circuit to the relay 23. When the operator returns to within the operating zone, and hence light is reflected on one or more of the photoelectric cells, the coils 43 of the relay in the electronic circuit are energized sufficiently to cause the core 44 to shift the switch arm 28 out of engagement with the contact 29 and shift the switch arm 76 into engagement with the contacts 77, 78 so that now the circuit to the windings of the resetting relay 74 are energized, causing the movable member to push the piston 70 through its rod 71 upwardly, rocking the arm 72 upwardly to reset the cut-out switch arm 76 in the position in which it engages the contact 67. However, the circuit to the relay 23 is open, because of the switch arm 28 being separated from the contact 29. When the operator moves out of the operating zone, the relay 43 of the electronic circuit is de-energized, and hence the switch arm 28 of the relay engages the contact 29 and closes the energizing circuit to the relay 23 and opens the energizing circuit to the relay 74. Hence the press closes on the next operation.

A manually operable release valve 90 is provided, this being shown as connected in the pipe 59, so that the press may be opened at any time, regardless of the automatic control. This valve 90 may be a remote control, that is, the valve 90 for machine A may be located near machine B, and the valve 90 for machine B may be located adjacent machine A. The valve 90 exhausts through pipe 91 which is connected to pipe 73 leading to cylinder 70. Hence, when the manual valve 90 is opened, the air exhausts from the diaphragm chamber 52 through pipe 59, casing of valve 90, pipes 91, 73 and out through ports 70A prior to the resetting of the switch arm 66 by the relay 74.

What I claim is:

1. A safety control for machines having an opening and closing movement and embodying power actuating mechanism including a motor; said control including a power control element operable to control the flow of power to the motor, means for controlling the operation of said element including an electro-responsive means, an energizing circuit therefor, switch means in said circuit, sources of light, a photoelectric cell means arranged out of the path of the rays from the sources of light and in the path only of reflected rays of the sources of light from a person coming within the operating zone of the machine, and amplifying circuits controlled by the photoelectric cell having a relay therein for operating said switch means, the sources of light and the photoelectric cell means being located to receive reflected rays from at least the front and lateral sides of the machine.

2. A safety control for machines having an opening and closing movement and embodying power actuating mechanism including a motor; said control including a power control element operable to control the flow of power to the motor, means for controlling the operation of said element including an electro-responsive device, an energizing circuit therefor, a switch in said circuit, a source of light, a photoelectric cell arranged out of the path of the rays from the source and in the path of reflected rays of the source from a person coming within the operating zone of the machine, amplifying circuits controlled by the photoelectric cell and having a relay therein for operating said switch, and releasable means for locking the machine closed independently of the photoelectric cell control.

3. A safety control for machines having an opening and closing movement and embodying a power actuating mechanism including a motor, said control including a power control element operable to control the flow of power to the motor, means for controlling the operation of said element including an electro-responsive device, an energizing circuit therefor, a normally closed switch in said circuit, a source of light, a photoelectric cell arranged out of the path of the rays from the source and in the path of the reflected rays of the source of a person coming within the operating zone of the machine, an electronic amplifying circuit controlled by the photoelectric cell and having a relay therein for operating said switch to open it, releasable means for holding the control element operated independently of the photoelectric cell control and the electro-responsive device, a normally closed cut-out switch in the energizing circuit in series with the former switch and operable into open position by the locking operation of the releasable locking means, and means for resetting the cut-out switch in closed position upon the release of the locking means including a second electro-responsive device and an energizing circuit therefor having a normally open switch therein controlled by the photoelectric cell and amplifying circuit and movable into closed position thereby when the switch in the first energizing circuit is moved to open position.

4. A safety control for machines having an opening and closing movement and embodying a power actuating mechanism including a motor, said control including a power control element operable to control the flow of power to the motor, means for controlling the operation of said element including an electro-responsive device, an energizing circuit therefor, a normally closed switch in said circuit, a source of light, a photoelectric cell arranged out of the path of the rays from the source and in the path of the reflected rays of the source of a person coming within the operating zone of the machine, an electronic amplifying circuit controlled by the photoelectric cell and having a relay therein for operating said switch to open it, releasable means for holding the control element operated independently of the photoelectric cell control and the electro-responsive device, a normally closed cut-out switch in the energizing circuit in series with the former switch and operable into open position by the locking operation of the releasable locking means, and means for resetting the cut-out switch in closed position upon the release of the locking means including a second electro-responsive device and an energizing circuit therefor having a normally open switch therein controlled by the photoelectric cell and amplifying circuit and movable into closed position thereby when the switch in the first energizing circuit is moved to open position, said locking means including a timer controlled by the operation of the actuating means and operable to release the actuating means after a predetermined time period.

5. A safety control for machines having an opening and closing movement and embodying power actuating mechanism including a motor; said control including a power control element operable to control the flow of power to the motor, means for controlling the operation of said element including an electro-responsive device, an energizing circuit therefor, a switch in said circuit, a source of light, a photoelectric cell arranged out of the path of the rays from the source and in the path of reflected rays of the source from a person coming within the operating zone of the machine, amplifying circuits controlled by the photoelectric cell and having a relay therein for operating said switch, releasable means for locking the press closed independently of the photoelectric cell control, timer means operable automatically by the actuation of the motor when closing the press, to release the locking means, a normally closed second switch in the energizing circuit for the normally closed, electro-responsive device in series with the first switch, and means operated by the actuation of the motor to open said switch when the press closes and thereby cut out the electro-responsive device.

6. A safety control for machines having an opening and closing movement and embodying power actuating mechanism including a motor, said control including a power control element operable to control the flow of power to the motor, means for controlling the operation of said element including an electro-responsive device, an energizing circuit therefor, a switch in said circuit, a source of light, a photoelectric cell arranged out of the path of the rays from the source and in the path of reflected rays of the source from a person coming within the operating zone of the machine, an electronic amplifying circuit controlled by the photoelectric cell and having a relay therein for operating said switch, releasable means for locking the press closed independently of the photoelectric cell control, a normally closed second switch in the energizing circuit for the electro-responsive device, means controlled by the actuation of the motor, to open said switch, and thereby cut out the electro-responsive device, an additional electro-responsive device and a normally open energizing circuit therefor controlled by the photoelectric cell controlled amplifying circuit for resetting the second switch in position to close the energizing circuit of the first electro-responsive device.

7. A safety control for machines having an opening and closing movement and embodying power actuating mechanism including a motor, said control including a power control element operable to control the flow of power to and from motor means for controlling the operation of said element including an electro-responsive device, an energizing circuit therefor, a normally closed switch in said circuit, a source of light, a photoelectric cell arranged out of the path of the rays from the source and in the path of reflected rays of the source from a person coming within the operating zone of the machine, an electronic amplifying circuit controlled by the photoelectric cell and having a relay therein, said normally closed switch constituting the armature of the relay and being opened when the relay is energized, releasable means operable to lock the press closed independently of the photoelectric cell control, timer means controlled automatically by the closing of the machine by the motor to release the locking means, a normally closed cut-out switch in the energizing circuit for the electro-responsive device in series with the former switch, means operated by the operation of the motor to open the cut-out switch, an additional electro-responsive device for resetting the cut-out switch in closed position, and an energizing circuit therefor controlled by the photoelectric cell controlled amplifying circuit, and a normally open switch therein, operated to closed position, by the relay operating the first switch, to open position.

WALLACE F. GAYRING.